(12) United States Patent
Bell

(10) Patent No.: US 10,675,629 B2
(45) Date of Patent: Jun. 9, 2020

(54) ANALYSIS DEVICE AND METHOD

(71) Applicant: Michael L. Bell, Fullerton, CA (US)

(72) Inventor: Michael L. Bell, Fullerton, CA (US)

( * ) Notice: Subject to any disclaimer, the term of this patent is extended or adjusted under 35 U.S.C. 154(b) by 0 days.

(21) Appl. No.: 14/773,373

(22) PCT Filed: Mar. 13, 2014

(86) PCT No.: PCT/US2014/025254
§ 371 (c)(1),
(2) Date: Sep. 7, 2015

(87) PCT Pub. No.: WO2014/151234
PCT Pub. Date: Sep. 25, 2014

(65) Prior Publication Data
US 2016/0023214 A1    Jan. 28, 2016

Related U.S. Application Data

(60) Provisional application No. 61/786,741, filed on Mar. 15, 2013.

(51) Int. Cl.
| | |
|---|---|
| *G01N 21/00* | (2006.01) |
| *B01L 99/00* | (2010.01) |
| *G01N 35/00* | (2006.01) |
| *G01N 1/38* | (2006.01) |
| *B01L 3/00* | (2006.01) |

(52) U.S. Cl.
CPC ......... *B01L 99/00* (2013.01); *B01L 3/502753* (2013.01); *G01N 1/38* (2013.01); *G01N 35/00871* (2013.01); *B01L 2200/027* (2013.01); *B01L 2200/0673* (2013.01); *B01L 2200/0684* (2013.01); *B01L 2300/0681* (2013.01); *B01L 2300/0838* (2013.01); *B01L 2300/0854* (2013.01); *B01L 2300/161* (2013.01); *B01L 2400/0644* (2013.01); *B01L 2400/0694* (2013.01); *B01L 2400/082* (2013.01); *G01N 2035/00099* (2013.01)

(58) Field of Classification Search
CPC ......... G01N 2035/00237; G01N 35/08; G01N 2035/1046
USPC ...................................... 422/93, 82
See application file for complete search history.

(56) References Cited

U.S. PATENT DOCUMENTS

| | | | | |
|---|---|---|---|---|
| 5,399,497 A | * | 3/1995 | Kumar | B01F 13/0809 422/68.1 |
| 2009/0235990 A1 | * | 9/2009 | Beer | B01F 3/0807 137/3 |

* cited by examiner

*Primary Examiner* — Natalia Levkovich

(57) ABSTRACT

A point of use analyzer includes pump, valve, port, and storage channel. The storage channel may hold multiple assay packets composed of reagent aliquots separated by bounding slugs. The storage channel may define an elongated lumen having two ends with each of the ends coupled to the valve. A sampling device for use with the analyzer engages the port and may include a recurrent coaxial tube having a separation medium. A method of using the analyzer with the sampling device includes steps of pumping a fluid to displace a sample into the separation medium and out through the opposed connection.

15 Claims, 9 Drawing Sheets

ANALYSIS DEVICE AND METHOD

This application is a continuation of PCT Application No. PCT/US14/25254, which claims priority to U.S. provisional application Ser. No. 61/786,741 filed Mar. 15, 2013, the disclosure of which is incorporated by reference.

TECHNICAL FIELD

This invention relates to fluid handling in portable analyzers for point of use analysis.

BACKGROUND ART

Fluid sample analysis, such as clinical sample analysis, involves several operations that may be conducted with different frequencies. For example, an analyzer may run test analyses as needed. It may reload reagents as materials are exhausted or expire. It may calibrate particular assays as a reagent lot runs out or as operating conditions change. An analyzer may run quality control specimens at fixed intervals.

An analyzer in a point of use environment may have widely varying workload. For example, in a physician's office, an analyzer might be idle much of the time. However, when a physician needs to determine a patient's condition, the physician may need or desire to know a fair number of analyte values while the patient is still present—a relatively short period of time. There is thus a need for an analysis system that can provide a number of measured values on a single sample within a short time.

To be most useful, a point of use analyzer should be available wherever and whenever needed. This may require that the analyzer be operable when carried, which in turn requires the analyzer to operate despite changes in orientation. The analyzer should be loadable with any necessary reagents for determinations on multiple samples to support calibration and quality control and to obviate cost of and need for the user carrying separate analyte-specific consumable devices. There is thus a need for an analysis system that can be preloaded with reagents and that can be stored and operated with changing orientation.

Use of an analyzer requires collection and preparation of samples. Traditional laboratory analysis collects large volumes of sample (as by venipuncture) and processes the collected sample by centrifugation, a relatively slow process that uses bulky equipment. There is a need to provide sampling devices that are compact and do not require bulky equipment or time consuming manipulation.

DISCLOSURE OF INVENTION/SUMMARY

In some embodiments, the invention includes an analyzer comprising fluidically connected pump, valve, port, and storage channel. The pump, port, and storage channel may be fluidically coupled to the valve. The storage channel may hold multiple assay packets composed of reagent aliquots separated by bounding slugs. The analyzer also includes a controller such as a microprocessor that operates the valve and the pump to form the assay packets. The storage channel may define an elongated lumen having two ends.

The analyzer may receive a sample from a sampling device that engages with the port so that the pump and valve can control the distribution of sample. The analyzer forms a test packet by combining a portion of the sample with one of the assay packets. The analyzer can form a number of such test packets, each including a portion of sample and an assay packet, permitting analysis of a variety of analytes.

The analyzer may also include a vent fluidically coupled to the valve. The valve includes a common channel coupled to the pump so that the pump may be selectively engaged with the port and the storage channel by positioning the valve to align the common channel with fluid connections coupled to the port or with one end of the storage channel. In some embodiments, the valve may include a second common channel fluidically coupled to a vent. The valve may be configured such that, when the common channel aligns with one end of the storage channel, the second common channel aligns to the opposite end of the storage channel.

The analyzer may include multiple storage channels, each connected to the valve and each containing a collection of assay packets or bulk reagents.

The valve may be a rotary shear valve that includes a stator having substantially cylindrical cavity and a rotor disposed in the cavity. Both stator and rotor may include drive elements. The analyzer may switch the valve position by selectively activating one or more of the drive elements.

The rotor may include a circumferential surface separated from the cylindrical wall of the cavity by a gap where the gap is configured to confine an isolation fluid.

The sampling device may include a tube having connections at its ends and a separation medium within the tube lumen. A user adds a whole blood specimen to the loading end of the tube. The analyzer delivers a displacement fluid to the loading end of the tube, pushing the blood into the separation medium and displacing part of the plasma out the opposite end.

In some embodiments, the analyzer delivers an aliquot of displacement fluid through the opposite end displacing a portion of the whole blood specimen out the loading end. The analyzer may dilute or subdivide the sample and associate the subdivisions with assay packets to form test packets.

The sampling device may be configured as a recurrent tube, so that both connections are adjacent one another. Connections and the recurrent tube may be coaxial. The tube lumen may be divided into a separatory region containing the separation medium and a collection chamber adjacent the loading end. A flow isolator between the collection chamber and the separatory region may hold the sample out of the separation medium so that the analyzer can control separation timing for consistent operation.

The sampling device may contain a reagent within the tube.

In some embodiments, the flow isolator includes a section of the flow channel of larger diameter than the collection chamber or a section of the flow channel with a hydrophobic surface.

The sampling device may also include a retainer and identification indicia on the external aspect of the tube.

A sample delivery method using the sampling device may include contacting a specimen with the separation medium in the sampling device, introducing a displacement fluid from the first end, and displacing at least a portion of the liquid component of the specimen from the separation medium and through the second end. In some embodiments, the method includes additional steps such as introducing a displacement fluid through the second end; and displacing at least a portion of the whole blood specimen through the first end. The method may use any of the described embodiments of the sampling device including one configured as a recurrent coaxial tube.

An analyzer may engage the connections of the sampling device and read any identification indicia. The engagement may include rotating the sampling device with respect to the analyzer and reading the identification indicia. The analyzer may also advance the specimen across the flow isolator into the separation medium.

BRIEF DESCRIPTION OF THE DRAWINGS

FIG. 5b shows a cross sectional view of the embodiment of FIG. 1 through the plane containing the line marked A-A on reference view FIG. 5a.

DETAILED DESCRIPTION

The analysis system may include major functional blocks of a base station, a handheld analysis device (the analyzer), reagents, and sampling devices. A wirelessly-coupled external operator interface device such as a phone or tablet computer may form another functional block.

The base station may be a tabletop scale device designed to prepare the analyzer for use, such as that described in U.S. Pat. No. 7,431,883 to Bell, the disclosure of which is incorporated by reference. In typical operation the user mounts the analyzer in the base station at intervals, such as once per day. The base station cooperates with the mounted analyzer to perform a variety of preparative functions. These functions include draining expended or expired materials from the analyzer; performing maintenance procedures such as rinsing fluid channels in the analyzer; loading fresh reagents to the analyzer; calibrating the analyzer and loaded assays; performing assays of quality control materials; transferring information; and recharging the analyzer batteries.

The analyzer is a device carried or held by a user so as to be available for assays whenever required. It contains onboard reagents necessary to perform any of a variety of assays. Because it may be hand held during use, its orientation may change in unpredictable ways. The analyzer must maintain its supply of reagents and perform analyses despite changes in orientation.

Reagents are materials, generally liquids or suspensions, which react with or support reactions with samples to detect or quantitate analytes of interest. Reagents also include materials to isolate, separate, rinse, dilute, or calibrate samples and reactions. Such reagents are well known in clinical analysis.

Analyzer

Figure 1:
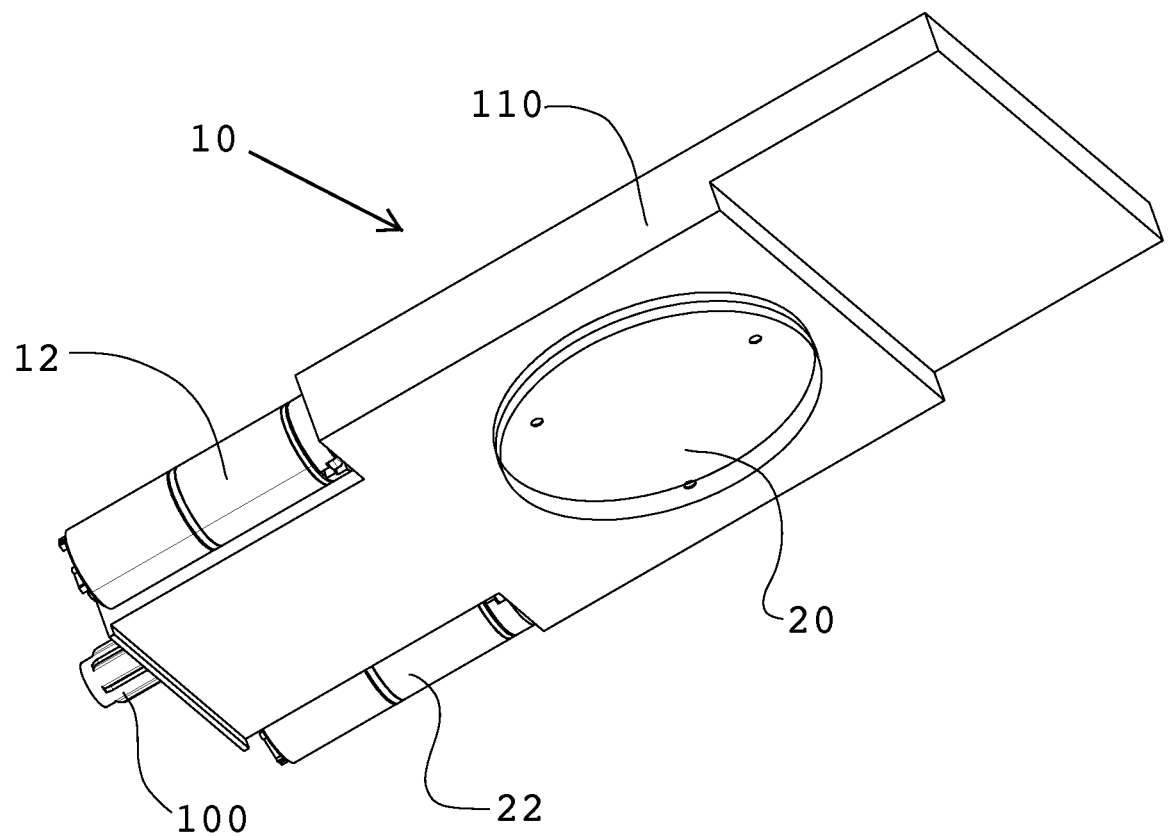
FIG. 1 shows a view of an embodiment of the fluid handling portion of a portable analyzer.
Figure 2:
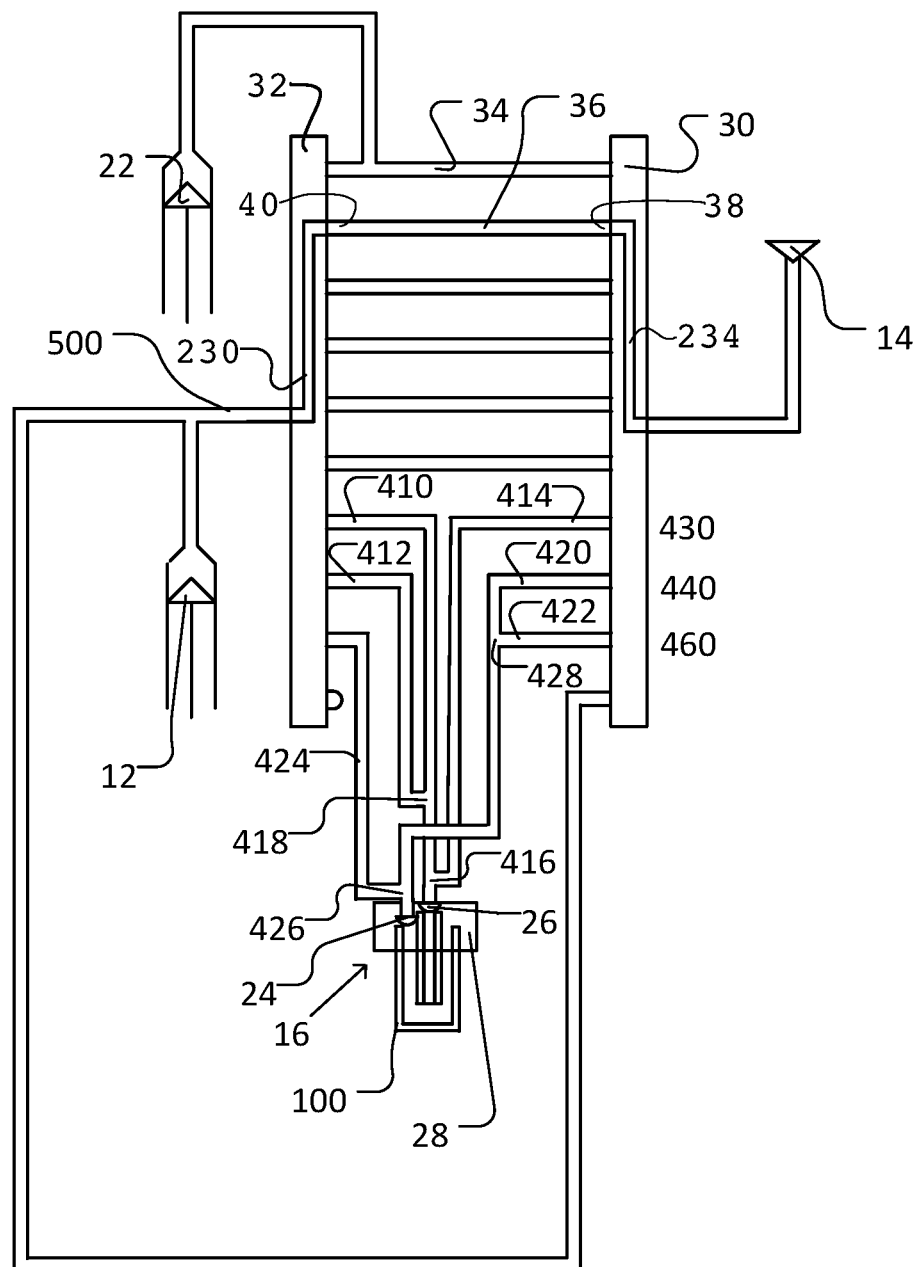
FIG. 2 shows a diagrammatic view of a portion of the fluids handling section of an embodiment of a portable analyzer.

Referring to FIGS. 1 and 2, the fluid handling portion 10 of the analyzer includes a pump 12, a vent 14, a port 16, fluid channels (not visible in FIG. 1, but disposed in manifold 110), a valve 20 and fluids (not shown). A sampling device 100 may be attached to the analyzer at port 16 during analysis. The analyzer also includes housing, electronics, and a power source such as a battery (not shown). While not illustrated, a controller, which may be a microcomputer or similar electronic device, controls the operation of the various parts. The discussion that follows refers to operations performed by the analyzer or by a component of the analyzer. These references refer to control by the controller as mediated by appropriate driver electronics and software known in the art.

FIG. 2 illustrates fluidics diagrammatically. Closely spaced parallel lines (such as storage channels 36) indicate fluid channels. The large rectangular elements each contacting multiple channels are parts of a valve 20 such as a linear shear valve or a rotary shear valve with its switching surface "unwound" to more clearly illustrate the multiple connections. Each of rectangular elements 30 and 32 corresponds to connections alignable with a single common channel. Valve 20 may include only a single common channel, in which case rectangular elements 30 and 32 correspond to independent valves. Alternatively, a single valve may have more than one common channel, in which case the two illustrated rectangular elements 30 and 32 form part of a single valve with two common channels 230 and 234.

Pump

Pump 12 may be positive displacement pump such as a syringe pump or a fixed seal piston pump. In some embodiments, the analyzer includes a second pump 22 coupled to an analysis channel 34 and selectively coupled to pump 12 through a valve. Second pump 22 may alternately receive test packets from pump 12 and drive received test packets through analysis channel 34 similarly to operations described in U.S. Pat. No. 5,399,497 to Kumar et al., the disclosure of which is incorporated by reference. A test packet comprises an assay packet (described below) and a sample aliquoted with the assay packet for analysis.

Vent

Vent 14 may be a connection to ambient air or to a plenum or to a relatively large capacity reservoir such as a waste chamber. In some embodiments, vent 14 includes a filter to prevent or limit aerosol dispersion.

Port

Port 16 is a connection point for adding or removing reactants to the analyzer. At different times, port 16 may connect to an external device such as a base station to replenish reagents and drain wastes, or a sampling device 100 to receive samples for analysis. Port 16 includes one or more fluid connections 24 and 26. In some embodiments, connections 24 and 26 are coaxially arranged for ease of simultaneous coupling to external devices.

Port 16 may be covered with a port seal 28 that closes port connections 24 and 26 to prevent leakage when port 16 is not connected to an external device. Port seal 28 may also serve to interconnect port connections 24 and 26 to allow washing or rinsing of port 16 and associated channels and intersections 410-428. In some embodiments, port seal 28 may include an elastomeric cover with an opening such as a slit that permits at least a portion of an external device to enter but closes when no external device is present. Alternatively, port seal 28 may include a sliding or inflatable component that the analyzer or user deploys when external devices are removed.

Channels

The analyzer operates by moving fluids through channels. Channels are elongated cavities of small cross section relative to their length. Channels may comprise the lumens of extruded or molded tubes, such as fluorocarbon plastic tubing. Alternatively, channels may form part of a manifold within a substantially solid block of material. Manifold channels may be formed by machining, impressing, cutting, or molding elongated trenches or voids in flat plates or foils and then bonding the plates or foils together, or by drilling holes in bulk material. Suitable plate materials include polymers such as acrylic plastic where the plates are diffusion bonded by commercially available processes such as those offered by Eastern Plastics division of IDEX Corporation of Bristol, Conn. In some embodiments, plates may comprise substrates with hydrophobic surfaces including fluorocarbon plastics such as FEP or PFA or surface-treated acrylic. Fluorocarbon plastic plates may be bonded thermally or by metallization and controlled microwave exposure to selectively heat the plates at bonding surfaces. In other embodiments, a manifold incorporating channels and other features may be formed by an additive manufacturing process.

In some embodiments, channels may comprise both manifold channels and channels formed of extruded tubing. Such channels may be joined to one another using conventional couplings such as those manufactured by Upchurch Scientific division of IDEX Corporation of Oak Harbor, Wash. Alternatively manifold channels and extruded channels may be joined by press fit, by plastics welding, or by similar methods.

Channels may be of any cross sectional shape, but round, half round, or square shapes limit the area of wetted channel surface and help reduce carryover between successive channel contents. When channels formed in polymers with hydrophobic surfaces such as FEP are pre-wetted with an isolation liquid such as fluorocarbon liquid, the isolation liquid may preferentially fill sharp edges or corners of channels producing menisci with curved luminal surfaces that further reduce the surface area of aqueous reactants in the channels. Such isolation liquids serve to further reduce carryover of successive aqueous channel contents.

Channels may be of any diameter consistent with the size of the analyzer. Some channels may include regions of different diameters. Some channels, such as channels holding waste fluids, may be of large diameter because waste fluids may freely intermix with one another without effect on analyzer operation. Channels holding other fluids, such as reactant storage and analysis channels described below, may be of relatively small diameter so that individual aliquots separated by bubbles span the channel diameter. Surface tension helps prevent aliquots from mixing or bypassing one another when the analyzer changes orientation. Appropriate diameters for such channels depend on the nature of the channel wall material, the nature and presence of isolation fluids, and the nature of the reactants. With FEP walls, fluorocarbon liquid isolation fluid, and aqueous reactants, an appropriate channel diameter is in the range of about 0.2 mm to about 2 mm. In some embodiments, a channel diameter of about 1 mm is a good compromise between storage stability on orientation change and available space in a handheld analyzer.

Channels include analysis channels, storage channels, and operative channels.

The analyzer includes one or more analysis channels. Analysis channels may include photometric analysis channels such as those described in Kumar et al. Photometric analysis channels may include absorbance based optics and may also or alternatively detect fluorescent or luminescent light. Analysis channels may include detectors, light sources, locally increased channel cross sections forming "vanish" features as in Kumar et al. to combine adjacent reactant aliquots, magnets to selectively retain or release magnetically susceptible particles or liquids, or other elements appropriate to a particular analysis. Analysis channels may include, for example, ion selective electrodes for measuring ion activities or impedance sensors with a Coulter aperture for measuring and enumerating particles such as blood cells.

Storage Channels Store Fluids

Fluids include reactants, such as assay reagents and sample; system fluids, such as displacement fluids, wash liquids, diluents, buffers, isolation fluids, and air; and expended materials. Storage channels 36 may store or provide access to any of these fluids in undivided form. The analyzer may include a large number of storage channels. In some embodiments the analyzer includes from about 20 to 60 or more storage channels.

Figure 9:
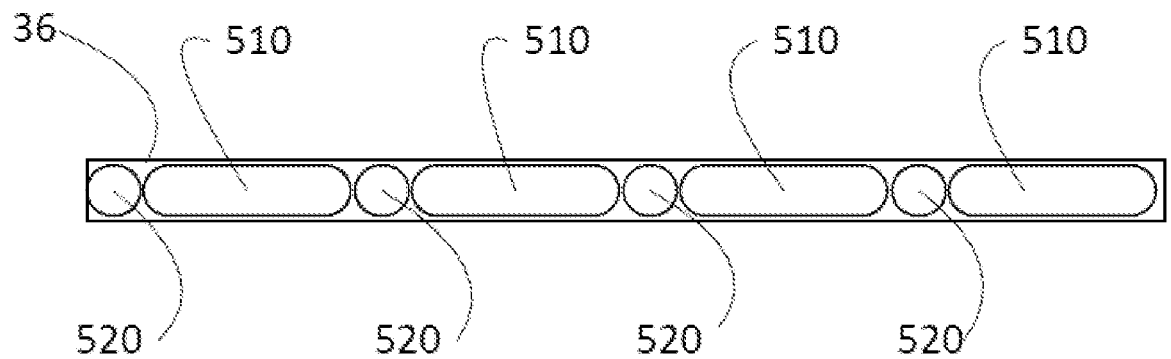
FIG. 9 shows a diagrammatic view of an embodiment of a storage channel containing assay packets.
Figure 10:
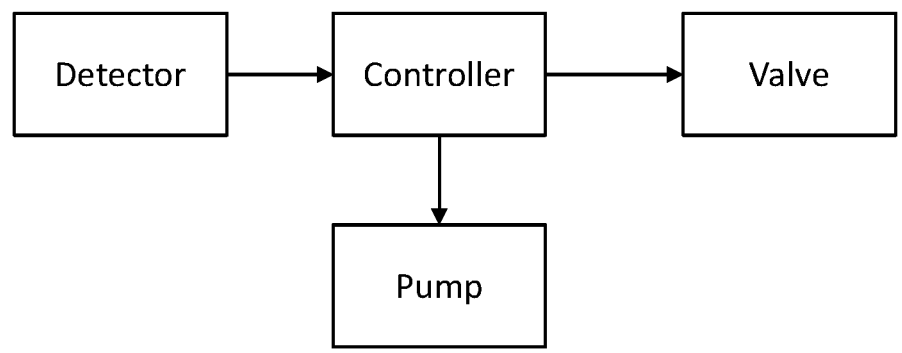
FIG. 10 shows a block diagram of connection of the controller in an embodiment of the invention.

Storage channels 36 may also or alternatively store reagents in pre-assembled packets so that a single storage channel 36 stores most or all non-sample components needed for multiple determinations of a particular analyte. Each pre-assembled packet (an assay packet) contains pre-aliquoted reagents for a single determination. Assay packets may include one or more measured volume reagent slugs separated by bounding slugs. Bounding slugs may also separate aliquoted sample slugs from reagents in test packets. FIG. 9. illustrates diagrammatically a set of assay packets disposed in storage channel 36. Reagent slugs 510 are separated by smaller bounding slugs 520 within the lumen of storage channel 36.

Bounding slugs comprise fluids substantially immiscible with reagents. Substantially immiscible fluids include liquids sparingly soluble in the reagent slugs. Where reagents are aqueous, substantially immiscible fluids include hydrophobic organic solvents, hydrocarbon and silicon oils, fluorocarbon liquids, and gases with limited aqueous solubility such as air. In some embodiments, a fluid in a bounding slug may be substantially immiscible with a reagent slug even though the fluid and the reagent may be miscible when exposed to one another in bulk. The relatively small contact area between reagent slug and bounding slug may serve to limit significant mixing to near the point of contact. This is especially effective when the reagent or the bounding fluid has relatively high viscosity, such as bounding fluids containing high concentrations of methyl cellulose or glycerol.

The analyzer may include about 30 or more storage channels dedicated to analyte-specific assay packets to accommodate a wide menu of tests. Each storage channel containing assay packets may include enough assay packets for a full day of anticipated use. In some embodiments, each storage channel accommodates from about five to about 30 assay packets. About ten assay packets may be an appropriate capacity for many applications as this number fits in a reasonable length storage channel and is a reasonable match to clinical workloads. Multiple storage channels may contain the same type of assay packets for high-use analytes. Some storage channels may have more capacity than needed for a particular analyte. The unused volume of such storage channels may be separated from the assay packets by a bounding slug and filled with air or with a displacement fluid.

In some embodiments, a single storage channel 36 may store assay packets for more than one analyte. Such mixed storage is appropriate for analytes frequently assayed on the same sample. For example, a single storage channel may contain assay packets for glucose, urea, and creatinine arranged in sequential order as these three assays are commonly run together as part of a basic metabolic panel.

A benefit of assay packet storage is that the analyzer or base station may set up at least a portion of an analytical reaction while the system is otherwise idle. This advantageously allows launch of an assay in a shorter time than would be possible were assay packets formed as samples arrive. By launching an assay in a shorter time, assays in progress may be read more frequently, because photometric analysis channels may operate by alternately launching an assay and reading assays already launched. Shorter assay launch time thus reduces the time between successive assay reads. Fast successive reads provide a higher data rate that more closely tracks rapidly developing photometric signals. The higher data rate permits use of faster reactions and hence a shorter time to result. A short time to result is particularly advantageous for a point of use analyzer because healthcare practitioners can use results during a single patient interaction. This reduces diagnosis and treatment delays improving outcomes and reducing costs.

The analyzer may set up assay packets by sequentially positioning valve 12 at a position that aligns the pump with a channel containing a first desired constituent of an assay packet. Pump 12 then aspirates the selected amount of constituent. Analyzer repositions valve 20 to the position of a channel containing the next constituent, and pump 12 again aspirates the requisite amount. One or more of the constituents may be fluid (such as air) to form a bounding slug. This process continues until a full assay packet, or a collection of multiple assay packets, are assembled sequentially in pump side valve common channel 230, in upper pass channel 274, and in its extension between the valve and the pump (marked as item 500 in FIG. 2) (collectively, the "pump-side channel").

In a similar manner, the analyzer may set up test packets as needed once a sample is available. The analyzer positions valve 20 at a position that aligns pump 12 with a storage channel containing the desired assay packets. Pump 12 then aspirates an assay packet from that storage channel into the pump-side channel and repositions the valve to align with a channel containing a bounding fluid, such as air. Pump 12 then aspirates the desired volume of bounding fluid as a bounding slug into the pump-side channel adjacent the aspirated assay packet. Analyzer then positions valve 20 at a position that aligns the pump with a channel containing sample. Pump 12 then aspirates the desired quantity of sample into the pump-side channel at a position adjacent the bounding slug. If needed, an additional bounding slug may be added to the pump-side channel. The analyzer then aligns the valve with an analysis channel and dispenses the fully formed test packet to analysis channel 34.

In the above description, pump 12 connects to one end 40 of storage channel 36 through the pump-side channel when valve 20 is appropriately positioned. The opposite end 38 of storage channel 36 connects through lower common channel 234, lower pass channel 273, and extension of lower pass channel (collectively, the "vent-side channel") to reach vent 14. Pump 12 aspirates part of contents of storage channel 36 and transfers that part to pump-side channel. Part of the content of vent-side channel moves into storage channel 36 through opposite end 38 of storage channel 36.

In some embodiments, the content of the vent-side channel is air delivered through vent 14. In other embodiments, vent-side channel may be prefilled with a displacement fluid, such as water or fluorocarbon liquid, so that the removed volume of storage channel 36 is replaced with a relatively incompressible displacement fluid. This advantageously reduces the possibility of shifting of storage channel content and improves subsequent dispense precision. To prefill the vent-side channel, valve 20 aligns with a storage channel containing the appropriate displacement fluid. Pump 12 dispenses a predetermined volume through pump-side channel so that a corresponding volume exits the opposite end of the selected storage channel and enters to prefill the vent-side channel. This prefill step would normally precede the transfer of assay packets out of storage channel 36.

A second method by which vent-side channel may be prefilled uses pump channel 500, which may be loaded with a displacement fluid. Pump channel 500 may continue beyond pump 12 to connect at its distal end to an addressable location on the vent side of valve 20. Corresponding pump-side of valve 20 is unconnected (as indicated by the stub connection in FIG. 2). When valve 20 is positioned so that vent-side channel of valve 20 aligns with the distal end of pump channel 500, the pump-side channel does not connect to a channel. With valve 20 thus aligned, aspiration by pump 12 transfers contents of pump channel 500 to pump 12; dispense by pump 12 transfers contents of pump 12 to pump channel 500. While aspirating, the distal end of pump channel 500 receives part of the content of vent-side channel. While dispensing, the distal end of pump channel 500 delivers part of its content to vent-side channel.

The above described embodiment transfers assay packets by aspirating with pump 12. In other embodiments, pump 12 may transfer storage channel content by dispensing similarly to that described for the first prefill operation. The skilled practitioner may apprehend the necessary plumbing changes to effect this embodiment. The availability of displacement fluid in pump channel 500 allows pump 12 to be positioned at a desired stroke position so that pump 12 may dispense displacement fluid to a storage channel.

Operative channels are a catchall category describing channels that connect between other locations, such as between pump and valve, between vent and valve, between valve and port, and between valve locations. These are described in more detail below.

Valve

The valve selectively couples channels to the pump and to the vent. Valves may comprise a cross point array or a network of three-way switching valves, but shear valves advantageously address fluidic connections with clean fluid switching and minimal pumping action. In some embodiments, the valve may be a rotary shear valve formed as a rotor disk within a stator formed as a cylindrical cavity. The rotor includes one or more common channels that may couple to the stator through rotary seals at or near the rotor axis. A 40 mm diameter rotor has circumference of about 125 mm. With channels about one mm across, each common channel in such a rotor valve can address about forty eight channels arranged about its circumference. Alternatively, the rotor can address channels disposed on a flat face of the stator cavity.

Figure 3:
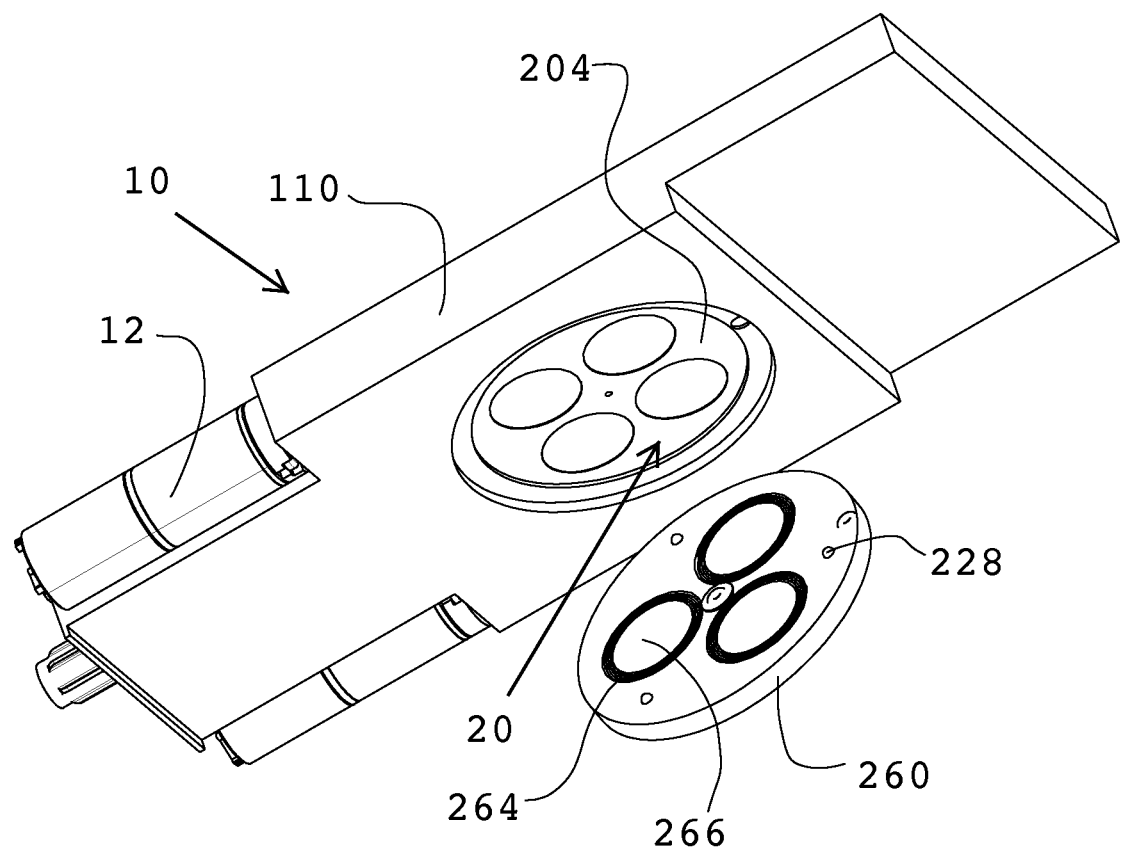
FIG. 3 shows a view of the embodiment of FIG. 1 with a stator plate and associated parts removed and reflected to show internal structure.
Figure 4:
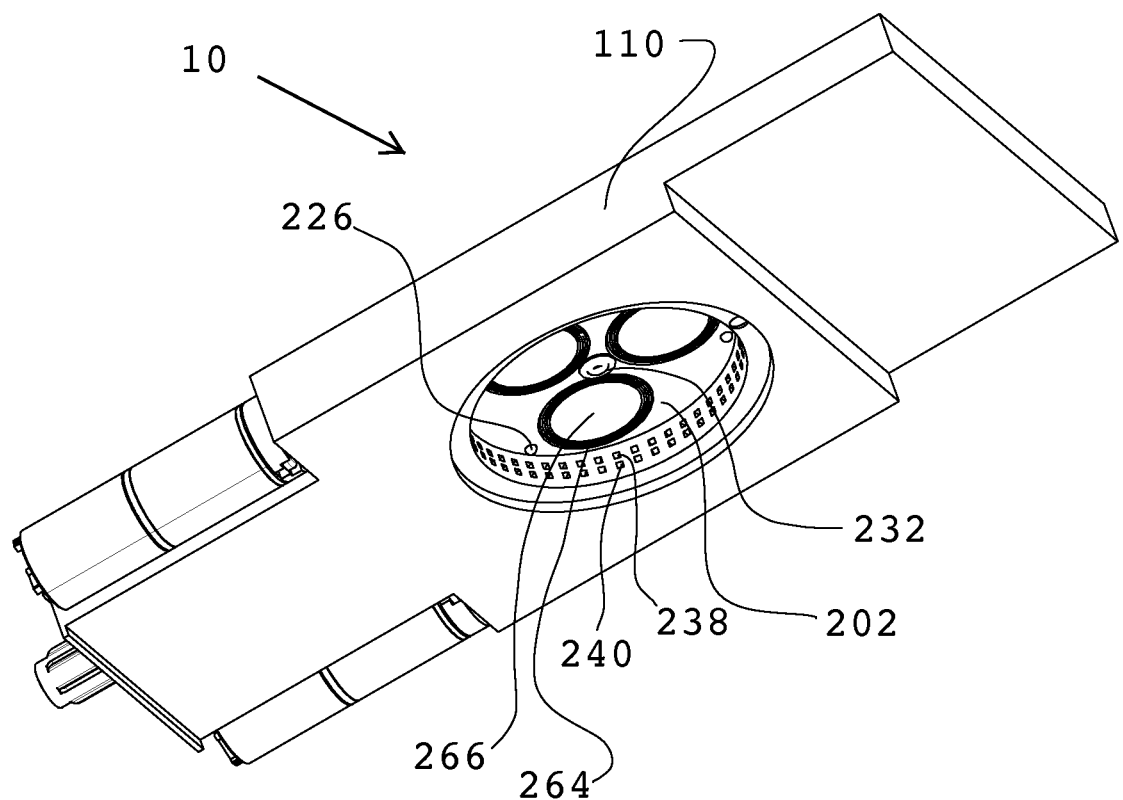
FIG. 4 shows a view of the embodiment of FIG. 1 with a valve rotor and associated parts removed.
Figure 5A:
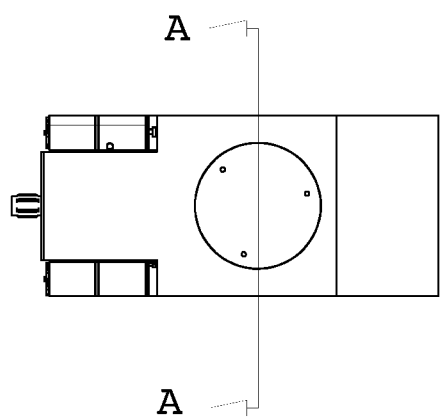
Figure 5B:
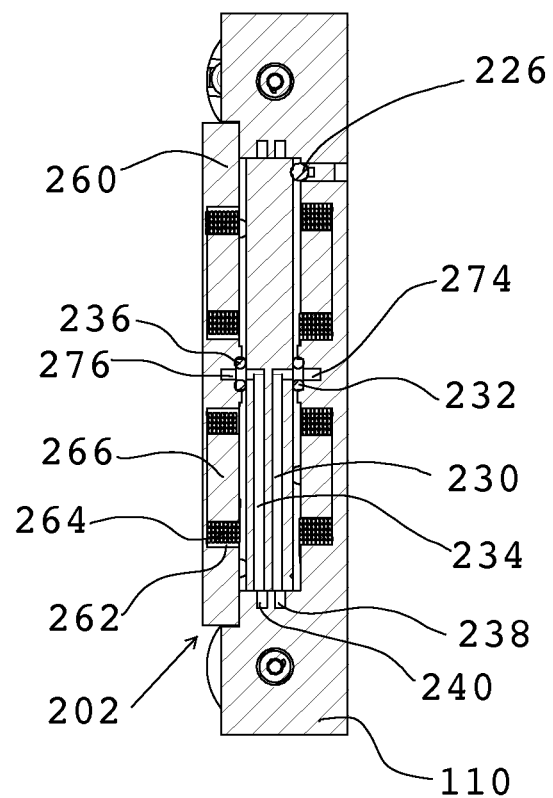
Figure 6:
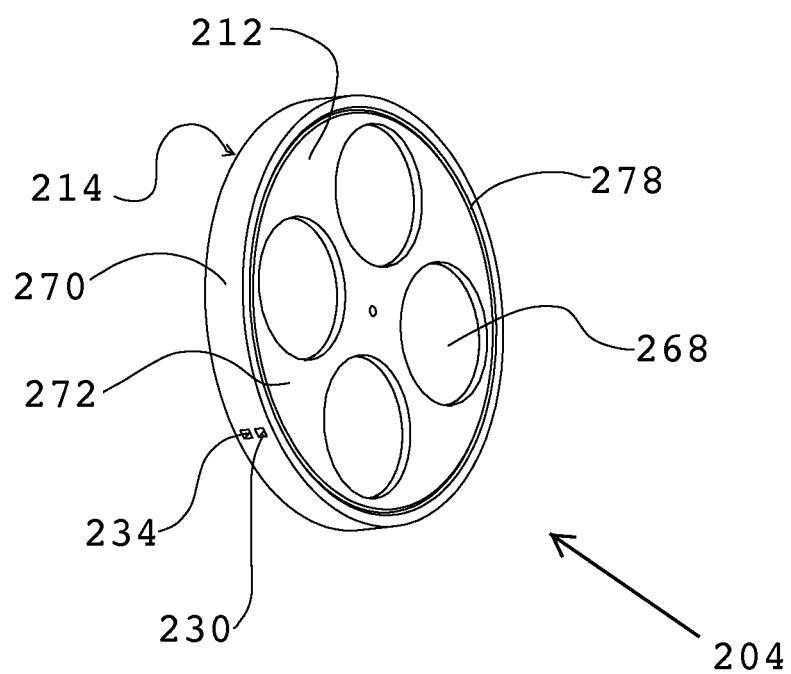
FIG. 6 shows a view of the valve rotor removed from the embodiment of FIG. 1.

Construction of an embodiment of a rotary shear valve may be appreciated by reference to FIGS. 3-6 where like parts bear the same item numbers. FIG. 3 shows a view of the stator cavity with the stator plate reflected downward to show interior detail. FIG. 4 shows a similar view with both valve rotor and stator plate removed. FIG. 5 shows a sectional view of the fluidics portion of the analyzer through the valve axis. Relative directions, such as upper, lower, above, below, vertical, and horizontal, in this description refer to the orientation with the outer surface of the rotor plate as the bottom.

Common channels may couple from stator to rotor through conventional rotary seals such as O-rings or quad rings disposed axially between faces of rotor and stator. Alternatively, common channels may couple to stator channels through segments of flexible tubing with the extent of movement of the rotor limited by software control to avoid twisting.

Rotary shear valve includes stator 202, rotor 204, bearings 226 and 228, and rotary seals 232 and 236.

Stator 202 comprises two pieces joined by fasteners, adhesives, welding, or interlocking geometry (not shown) to allow assembly. Manifold 110 forms the upper portion and stator plate 260 forms the lower portion of stator 202. Stator 202 defines a substantially cylindrical cavity 220 between manifold 110 and stator plate 260.

Stator 202 includes embedded channels including pass channels and switched channels. Upper and lower pass channels 274 and 276 align with the rotor axis at opposite rotor faces. Pass channels pass fluids to the rotor common channels via rotary seals. Switched channels terminate at the cylindrical surface of stator 202. Switched channels include a plurality of upper switched channels (e.g. 238) that align in the plane of rotor upper common channel 230 and a plurality of lower switched channels (e.g. 240) that align in the plane of rotor lower common channel 234.

Rotor 204 comprises a cylindrical body 272 (best visible in FIG. 6) with opposed flat faces 212 and 214 and circumferentially disposed switching surface 270. Body 272 includes common channels and may include drive elements. Upper common channel 230 connects the center of upper rotor face 212 to switching surface 270. Lower common channel 234 connects the center of lower rotor face 214 to switching surface 270. FIGS. 3-6 illustrate common channels 230 and 234 as radially aligned but common channels may be offset at an angle with respect to each other.

Rotor 204 is disposed within cavity 220. Cavity 220 includes upper cavity above rotor 204 and lower cavity below rotor 204.

Bearings comprising upper ball 226 and lower ball 228 support rotor 204 shown disposed at a fixed height within cavity 220. Upper ball 226 and lower ball 228 may ride in circumferentially disposed V-grooves 278 in rotor 204. Bearings may include additional balls angularly disposed about the rotor axis or may alternatively include sliding contact surfaces or conventional annular bearings. In some embodiments, bearings include three upper balls and three lower balls. Bearings may also include compliant members such as springs that bias any of upper ball 226 and lower ball 228 against rotor 204.

O-ring 232 disposed between upper rotor face 212 and stator 202 acts as a rotary seal between upper common channel 230 and upper pass channel 274. Lower common channel 234 connects to lower pass channel 276 via O-ring 236 disposed between lower rotor face 214 and stator 202. Common channels 230 and 234 extend vertically from respective rotor faces toward the center plane of the cylinder forming body 272. Common channels 230 and 234 then continue as horizontal segments through rotor 204 to switching surface 270. When positioned as in FIG. 5, rotor 204 couples switched channels 238 and 240 through respective common channels 230 and 234 to respective pass channels 274 and 276.

Pass channels connect to pump 12 and to vent 14 as visible in FIG. 2. Upper pass channel 274 may continue as pump side channel 500.

Rotation of rotor 204 selectively aligns the common channels to the desired switched channels at a defined addressable position, thereby connecting selected switched channels to the pass channels.

The analyzer may drive the rotor in a variety of ways. For example, the rotor may couple axially to a motor shaft, either directly or through gear teeth or pulley elements integral to or mounted coaxially with the rotor axis.

In other embodiments, the shear valve rotor can form part of a motor armature either by incorporating magnets, coils, or pole pieces. The rotor may contain both magnets and pole pieces to provide magnetic return paths or to reduce cogging. Embedded magnets or pole pieces may be sized and distributed within the rotor to avoid the common channel. Magnets, coils or pole pieces may be circular for ease of construction. Alternative coil and pole piece shapes, such as radially disposed trapezoidal prisms, may increase torque and reduce cogging. Selective application of current to windings adjacent the rotor, such as above or below the rotor, produces a torque that drives the rotor to a new position. The windings above and below may be angularly aligned to increase torque or may be offset from one another to increase drive resolution. Sequential applications of current among the windings step the rotor to any addressable angular position. This process aligns common channels with selected stator channels in a manner analogous to driving the armature of a stepper motor.

In some embodiments, the rotor may include four disk magnets 268 and the stator may include three windings above and three below the rotor. Each rotor disk magnet may be retained in a conforming cavity of rotor 204.

Bearings may maintain the spacing between rotor and stator faces. Bearings may include balls recessed in stator faces and optionally running within a groove in upper or lower rotor faces. Compliant elements such as springs may apply a seating force through bearings to one side of the rotor.

In the illustrated embodiment, both manifold 110 and stator plate 260 include pockets 262 containing drive elements comprising coils 264 surrounding cylindrical pole pieces 266. The drive elements in manifold 110 and stator plate 260 are angularly offset from one another about the rotor axis to increase drive resolution.

The valve switching process is under software control implemented by a controller selectively applying current to coils 264. An encoder (not shown) may sense rotor position.

Figure 7:
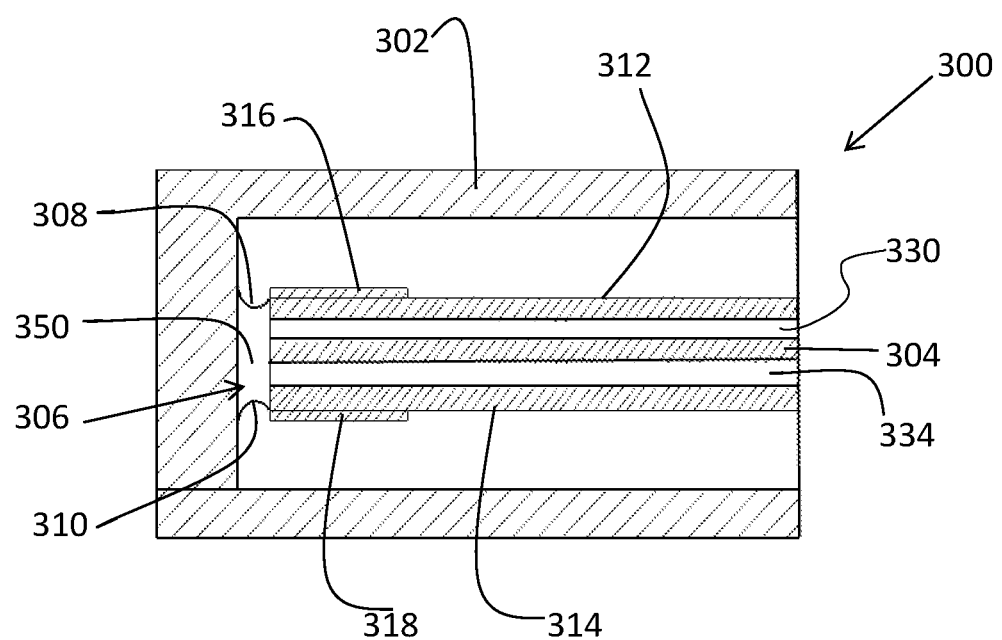
FIG. 7 shows a partial diagrammatic cross sectional view of an embodiment of a valve.

In some embodiments, the outside diameter of the rotor may closely approximate the inside diameter of a cylindrical cavity in the stator. Providing a narrow gap between these parts reduces friction making rotor motion easier and relaxing manufacturing tolerance requirements. The gap may include an isolation fluid as a lubricant or as an aid in sealing the valve from unwanted flow. Isolation fluid may be at least partially confined to the gap by surface tension when the isolation fluid wets the rotor and/or stator materials. FIG. 7 shows a partial diagrammatic sectional view of a portion of an embodiment of shear valve 300 including stator 302, rotor 304, and gap 306 between rotor and stator. Rotor 304 includes two parallel common channels 330 and 334. The radial width of gap 306 is exaggerated to show detail. Isolation fluid 350 within gap 306 is bounded by upper meniscus 308 and lower meniscus 310. The menisci form adjacent upper rotor surface 312 and lower rotor surface 314 where the size of the void between rotor and stator dramatically increases. FC 770 type of Fluorinert brand fluorocarbon liquid manufactured by 3M Company of St. Paul, Minn. sufficiently wets FEP polymer that an open FEP tube of 1 mm diameter supports a column at least 2 mm high. This degree of wetting is more than sufficient to fill a gap between rotor and stator when the gap is less than 0.5 mm irrespective of orientation. Machining of FEP and similar materials reasonably supports tolerances of 0.1 mm or less; FC 770 is thus suitable as an isolation fluid with gap widths within reasonable part tolerances.

Surface tension-based confinement of isolation fluid to a rotor-stator gap may be enhanced or augmented by inclusion of materials adjacent the gap that are not wettable by the isolation fluid. For example, where the rotor and stator are fluorocarbon polymers such as FEP and the isolation fluid is a fluorocarbon liquid, opposing faces of the rotor near the gap may include hydrophilic materials such as polyester as a covering film or inlay. Alternatively, those faces may be treated by painting, coating, or selective plasma etching and chemical treatment. In other embodiments, elastomeric seals such as O-rings may confine isolation fluid to the gap. In FIG. 7 first polyester film 316 covers a circumferential portion of upper rotor face 312. A second polyester film 318 covers an analogous portion of lower rotor face 314.

Sampling Devices

Sampling devices provide samples to the analyzer. Sampling devices are not part of the analyzer but removably connect to it through the port. In some embodiments, the sampling device includes a single-use consumable that both prepares a sample and delivers the prepared sample to the analyzer. The analysis system may include multiple types of sampling devices that support different sample preparation methods. For example, sampling devices may include one of several anticoagulants when the sample is blood. Some types may separate cells from liquid sample and other types may provide the sample as collected.

In some embodiments, a sampling device includes a fluid impermeable structure defining an inlet, an outlet, and a channel extending between the inlet and the outlet. Sampling devices may also include fluid connections, mechanical connections, gripping attachments, closures, and machine or human readable indicia.

The channel may extend as a straight lumen from one end of the sampling device to the other with inlet and outlet disposed at opposite ends. However, this linear configuration requires that a user seat connections at different ends of the device without touching either end. Other possible geometries include a tube that doubles back on itself so that both inlet and outlet of the channel are positioned at the same end of the sampling device. This permits a user to hold the device from one end while seating connections at the other.

The channel may include a vestibule, a portion of the channel adjacent the inlet in which sample material is first deposited. The vestibule may include surface properties and geometry configured to fill with an aqueous sample by capillary action. The vestibule may also include sample treatment materials such as anti-coagulant reagents. Anticoagulants may be stored in either a wet or dry form. Dry materials have advantages for shelf-life and handling. Anticoagulants are well known and will not be further described. Other reagents, such as diluent, lysing agents, or other pretreatment reagents may also or alternatively be present.

The portion of the channel closer to the outlet may include a separation medium. The purpose of the separation medium is to separate blood cells from liquid fractions of the blood. Many such separation media are commercially available, including GE Healthcare's glass fiber sheet grade VF2, Ahlstrom Corporation's Cytosep 1662 brand of plasma separation material, and others. Other separation materials may include surface-bound materials that have an affinity for blood cells. Such materials are generally available as thin sheets that may be cut, formed, or shredded and packed into a housing. Some samples, such as whole blood for cellular analysis or urine, do not need separation of cells to be analyzed. Embodiments of some sampling devices may therefore not include separation materials.

The separation medium may also contain reagents such as anticoagulants or clot accelerants.

Some embodiments of sampling devices include an isolator in a portion of the channel between the vestibule and the separation medium, if present. The purpose of the isolator is to help ensure uniformity of sample processing. The isolator prevents the sample from entering the portion of the sampling device beyond the vestibule. This may be useful, for example, when whole blood specimens are prevented from entering a blood separation medium until acted on by the analyzer. This assures that all separated samples spend similar amounts of times in the separation medium. This may reduce the possibility of cell lysis or of undesired loss of sample constituents from a prolonged exposure to separation materials.

In some embodiments, the isolator prevents movement of samples by surface properties and geometry. Where a hydrophilic surface material will actively wick aqueous samples, hydrophobic materials support wicking to a much lesser extent and may repel aqueous materials. Thus an isolator may include a transition of material within the channel from lesser hydrophobicity to greater. Alternatively, or in addition, the diameter of the channel may increase in the region of the isolator to prevent further sample travel absent a driving force or pressure.

Fluid connections couple sampling devices to the analyzer, but must also accommodate loading of sample to the sampling device. Tapered connections similar in principle to Luer style couplings and fittings commonly used in syringes, needles, infusion equipment, and similar devices, allow two parts to form a removable fluid tight connection and may be used as either or both connections on sampling devices. Inclusion of multi-start threads in such connectors make connection possible with a simple twist. Alternative connections may include face seals. Some embodiments may include both these two types of connections.

An embodiment of a sampling device appears in FIG. 8a-f. This embodiment 100 includes a core portion 120 and a sheath portion 140, both formed of fluid impervious plastic. Core portion 120 is a tubular part with core wall 121 defining a lumen 122. Upper end 123 of core portion 120 includes a taper connection 124 with about a 6% linear taper to connect to the analyzer. Lower end 125 includes castellated apertures 126. The boundary of lumen 122 at upper end 123 includes a gentle radius to make it easier for user to load a sample into lumen 122. Lumen 122 may include internal divisions (not shown) to help a sample wick into lumen 122 and to draw sample away from the tip at upper end 123 so that more sample may be added. Part way down lumen 122 is isolator 127. Isolator 127 includes a segment of lumen 122 of increased internal diameter. As discussed above, isolator 127 may serve to prevent sample from entering separation medium at an uncontrolled time. Isolator 127 may also include a segment of more hydrophobic material, such as a length of FEP tubing (not illustrated) disposed adjacent lower end 125.

Sheath portion 140 is generally cup-shaped and includes base 141, cylindrical sheath wall 142, and outer connection 143 disposed at the end of sheath portion opposite base 141. The outer aspect of sheath portion 140 includes grip elements 144, label recess 145, and thread tabs 146.

Base 141 includes features designed to attach to lower end 125 of core portion 120 so that core portion 120 may be inserted into sheath portion 140 to form a single assembly. The parts may join by inference fit, by adhesive or solvent bonding, or by similar methods. Apertures 126 in lower end 125 extend upward from lower end such that, when core portion 120 is seated in sheath portion 140, a flow path remains connecting lumen 122 through the unobstructed portion of apertures 126 into the space between the outer surface of the core wall 121 of core portion 120 and the inner surface of sheath wall 142 of sheath portion 140. This flow path continues to outer connection 143.

Outer connection 143 includes face seal 147 disposed on the extreme end surface of sheath portion 140. A gap remains between sheath wall 142 and the overhanging portion of taper connection 124. The flow path continues through this gap when sampling device connects to analyzer at port 16. When assembled in this manner, core portion 120 and sheath portion 140 form a recurrent tube with both ends of the tube disposed on the same end of the assembly. This permits both fluid connections to connect to the analyzer by holding the assembly from one end and advancing the assembly into the analyzer. As used herein, recurrent means turning back so as to reverse direction. The coaxial tube as described here is recurrent. A "U-shaped" tube with ends disposed side by side is also a recurrent tube.

Analyzer port 16 includes mating receptacle connections 24 and 26 complementary to sampling device taper connection 124 and outer connection 143. The dimensions are designed so that, with allowance for manufacturing tolerances, taper connection 124 will seal to mating taper receptacle 24 after face seal 147 contacts face of mating face receptacle 26. This compresses face seal 147 against mating face receptacle 26 as taper connection 124 seats into mating taper receptacle 24, and assures that both connections are fluid tight.

Analyzer port 16 also includes a multi-start thread surrounding taper receptacle 24 that is complementary to thread tabs 146 on upper aspect of outside of sheath wall 142. Thus sampling device 100 may be engaged with analyzer port 16 by inserting taper connection 124 into mating taper receptacle 24, engaging thread tabs 146 with complementary threads of port 16, and twisting sampling device into sealing relationship with a single motion. Thread tabs 146 may also serve to secure a cap (not illustrated) to sampling device 100 prior to use to preserve the device and after use to contain sample wastes.

Grip elements 144 aid in this process by allowing a user to firmly grasp and twist sampling device 100 into port 16. These may be a plurality of raised bosses parallel to the axis of sampling device 100, but a variety of shapes and designs are possible.

A portion of the exterior surface of sheath wall 142 above grip elements 144 and below thread tabs 146 includes an indented label recess 145 to accommodate a label (not shown). A label placed in label recess 145 may be read by a user to identify information about sampling device 100, such as the type of sampling device, lot number, expiration date, and anti-coagulant. Such information may also be color coded by combinations of colors for sheath portion 140 and core portion 120. A label within label recess 145 may also contain machine readable information such as a bar code or areal code. Such a code may be read during the insertion process as sampling device 100 rotates with respect to port 16 during insertion.

Sampling device 100 may also include separator 150 disposed in the space between the outer aspect of core wall 121 and the inner aspect of sheath wall 142. In some embodiments, separator 150 may include fibers macerated and inserted into sampling device 100. In other embodiments, separator 150 may include spirally wound sheet stock. A sheet separation medium may be cut into a strip and wrapped around core wall 121 before assembly of core portion 120 to sheath portion 140. Commercial separation material 0.3 mm thick may be wound about four times around core wall 121 and around already wound layers of separation medium. For ease of assembly, the wound separation medium may be covered with a section of compliant tubing or with a section of thin-walled heat shrinkable tubing.

Commercial separation media include depth filters, membrane filters, or hybrid filters. Membrane filters efficiently block all blood cell from passing but clog quickly. Depth filters allow blood cells to penetrate some distance into the medium before eventually entrapping them. Depth filters may allow some cells to escape. Hybrid materials include some aspects of both types. It may be advantageous to include in separator 150 a depth filter spirally wound as discussed with a section of membrane or hybrid filter proximate outer connection 143 to stop any remaining cells.

Figure 8:
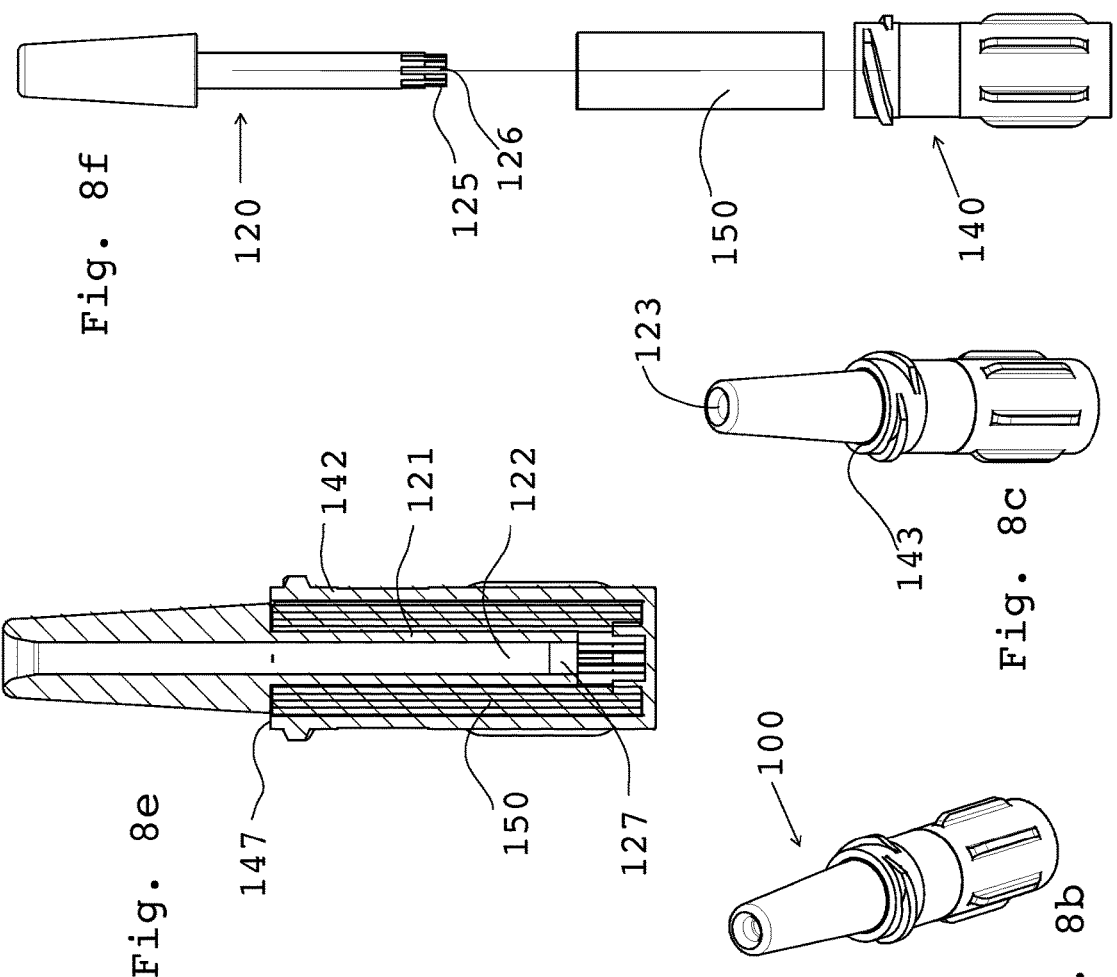
FIG. 8a-d show multiple views of an embodiment of a sampling device.
FIG. 8e shows a cross sectional view of the sampling device of FIG. 8d through a plane containing the line A-A.
FIG. 8f shows an exploded view of the embodiment of a sampling device of FIG. 8d.

FIG. 8e shows a cross section of the sampling device of this embodiment revealing the position of separator 150 between core wall 121 and sheath wall 142. The structure is also visible in exploded view of FIG. 8f.

Sampling Process

The sampling process is best understood by reference to FIG. 2. Pump 12 connects through first valve side 32 of valve 20 to a selected channel at a selected addressable valve position indicated by item numbers to the right of the second valve side 30. When aligned in a labeled position (such as position 430), valve 20 connects pump 12 to the channel (here channel 410) attached to valve side 32 in line with the labeled position. Valve 20 also connects vent 14 to the channel (channel 414) attached to valve side 32 in line with the labeled position.

Conduits related to the sampling process include sampling device 100, port connection 24 coupled to sampling device outer connection 143, and port connection 26 coupled to sampling device taper connection 124. Three channels branch from each of the port connections 24 and 26. A short channel (unlabeled) extends from port connection 24 to first branchpoint 426. Beyond first branchpoint 426, channel 420 reaches second branchpoint 428 and then continues to connect to valve vent side at position 440. Beyond second branchpoint 428, channel 422 extends to valve vent side at position 460. Channel 424 continues as the other branch past first branchpoint 426 and connects to valve pump side at position 460.

A short channel (unlabeled) extends from port connection 26 to third branchpoint 416. Beyond third branchpoint 416, channel 410 extends past fourth branchpoint 418 and connects to valve pump side at position 430. Channel 414 continues as the other branch past third branchpoint 416 until reaching valve vent side at position 430. Beyond fourth branchpoint 418, channel 412 extends to valve pump side at position 440.

Thus there are three channels from each connection of sampling device 100. Two channels from the loading side of sampling device 100 (taper connection 124) extend to the pump side of the valve; the remaining channel extends to the vent side of the valve. Channels from the opposite side of sampling device 100 (outer connection 143) have the reverse distribution—two extend to the vent side of the valve and the third extends to the pump side.

In operation, a user loads a sample, such as a fingerstick capillary blood sample, into lumen 122 through the opening in taper connection 124. Sample may be loaded directly from an expressed fingerstick droplet or through a collection capillary or similar device. User may also or alternatively transfer a bulk sample, as from a venous draw or urine cup, into lumen 122. User then loads sampling device 100 through port seal 28 into analyzer port 16 by twisting and advancing the part.

Analyzer may read information relevant to processing as sampling device 100 seats into port 16. Analyzer may also vary the sampling process based upon the read information. For example, if the read information indicates that sampling device is of a type that does not include a separator, analyzer may select air as a separation fluid to reduce the possibility of sample dilution.

A first embodiment of a sample process loads a separated sample (such as plasma) into the analyzer. Once sampling device 100 is seated, analyzer positions valve 20 at position 440 and pumps a displacement fluid through channel 412 and into taper connection 124. Displacement fluid may be air, saline, or a viscous aqueous solution such as glycerol-saline. Displacement fluid pressure forces blood beyond isolator 127 and into separator 150. Blood wicks into separator under capillary action (and optionally with additional displacement flow or pressure). After a suitable time for separator to trap blood cells (30 seconds to 2 minutes depending on geometry and volume), analyzer pumps further displacement fluid into sampling device 100, pushing plasma ahead of the front of displacement fluid and out through outer connection 143, through port connection 24, and into channel 420. Continued pumping moves the plasma front beyond first branchpoint 426 and thence up channel 420 to second branchpoint 428. Plasma front enters channel 420 because channel 420 connects to vent 14 via valve vent side 30. No other connected channel can accommodate significant flow because none are vented when valve is positioned at position 440.

Once the plasma front passes a predetermined distance beyond first branchpoint 426 (or alternatively, after plasma front passes second branchpoint 428), analyzer positions valve 20 at position 460 and aspirates separated sample through channel 424 into the channel connected to pump 12 for storage or processing. Pump 12 may then rinse any channels that had been wetted by fluid in preparation for further actions.

A second embodiment of the sample process combines the transfer of a portion of whole blood (for cellular analysis or for other analytes requiring cells, such as glycated hemoglobin). Analyzer positions valve 20 at position 440 and aspirates whole blood past third branchpoint 416. Analyzer then positions valve 20 at position 430 and aspirates whole blood from the segment of channel 410 beyond third branchpoint 416 into the channel connected to pump 12 for storage or processing. Pump 12 may then rinse any channels that had been wetted by fluid in preparation for further actions.

After removing an aliquot of whole blood, analyzer may then collect plasma by performing the first recited process. Thus with a single sampler, analyzer may collect both whole blood and liquid sample (plasma or serum) and perform a wide range of analyses.

The provision of channel geometry having multiple branch points and multiple valve positions coupled to the channels allows a variety of choices of sample handling sequences that combine features or concepts of the above embodiments. A skilled practitioner may apprehend alternative processes based on this geometry that produce similar results, including substitution of dispense actions for aspiration actions as previously discussed with reference to storage channels.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, such feature, structure, or characteristic in may also be used in connection with other embodiments whether or not explicitly described.

This disclosure mentions certain other documents incorporated by reference. Where such documents conflict with the express disclosure of this document, this document shall control.

I claim:

1. An analyzer for analyzing a sample, the analyzer comprising:
   a pump;
   a valve fluidically coupled to the pump;
   a port fluidically coupled to the valve and configured to receive a sample;
   a first storage channel fluidically coupled to the valve, the first storage channel consisting of an elongated lumen, a first end, and a second end;
   a plurality of first assay packets stored in the first storage channel, the plurality of first assay packets including prealiquoted reagents and substantially immiscible bounding slugs, the prealiquoted reagents separated by the substantially immiscible bounding slugs;
   a detector configured to detect a signal; and
   a controller operatively coupled to the pump, to the valve, and to the detector, the controller programmed to operate the pump and the valve to remove an assay packet of the plurality of first assay packets from the first storage channel, to combine a received sample with the removed assay packet to form a test packet, and programmed to receive the signal of a reaction in the test packet from the detector,
   wherein each of the first end and the second end directly contacts the valve, wherein the lumen is in fluid communication with the valve through the first end and through the second end.

2. The analyzer of claim 1 wherein the controller is further programmed to operate the valve and the pump to form the plurality of first assay packets.

3. The analyzer of claim 2, wherein the port is configured to engage with a sampling device, and wherein the controller is further programmed to load a sample from a sampling device when the sampling device is engaged with the port.

4. The analyzer of claim 3, wherein the controller is further programmed to form the test packet by combining a portion of the loaded sample with the assay packet.

5. The analyzer of claim 1, further comprising a vent fluidically coupled to the valve, wherein the valve includes a first common channel and a second common channel, the first common channel fluidically coupled to the pump, and the second common channel fluidically coupled to the vent, and wherein the valve is positionable to connect the first common channel to the first end and the second common channel to the second end.

6. The analyzer of claim 1, wherein the valve includes a stator and a rotor, the stator defining a substantially cylindrical cavity and the rotor disposed in the cavity, the rotor incorporating first drive elements.

7. The analyzer of claim 6, wherein the valve further includes a bearing disposed between the rotor and the stator, wherein the stator includes second drive elements, wherein the first and the second drive elements include one or more of magnets, coils, or pole pieces, and wherein the controller operates the valve by selectively activating one or more of the first and the second drive elements.

8. The analyzer of claim 6, wherein the rotor includes a circumferential surface separated from the cylindrical wall of the cavity by a gap, the gap configured to confine an isolation fluid.

9. The analyzer of claim 8, wherein the circumferential surface and the cylindrical wall each include fluoropolymer materials, and wherein the isolation fluid includes a fluorocarbon liquid capable of wetting the fluoropolymer materials.

10. The analyzer of claim 1, further comprising a second storage channel fluidically coupled to the valve and a plurality of second assay packets stored in the second storage channel.

11. The analyzer of claim 1, further comprising a sampling device including:
   a tube defining a flow channel having a first channel end and a second channel end;
   a separation medium disposed in the flow channel;
   a collection chamber disposed intermediate the first channel end and the separation medium;
   a first connection disposed on the first channel end; and
   a second connection disposed on the second channel end, wherein the first connection is disposed coaxially to the second connection.

12. The analyzer of claim 11, wherein the sampling device further comprises a sample treatment material disposed within the tube.

13. The analyzer of claim 12, wherein the sampling device further comprises a flow isolator disposed between the collection chamber and the separation medium.

14. The analyzer of claim 13, wherein the flow isolator includes a section of the flow channel of larger diameter than the collection chamber or a section of the flow channel with a hydrophobic surface.

15. The analyzer of claim 1, wherein the first storage channel content consists of non-sample components.

* * * * *